Aug. 13, 1957  C. W. WEBER  2,802,231
WIPER MECHANISMS

Filed Aug. 22, 1956  3 Sheets-Sheet 1

Inventor
C. W. Weber
Fetherstonhaugh & Co.
Attorneys

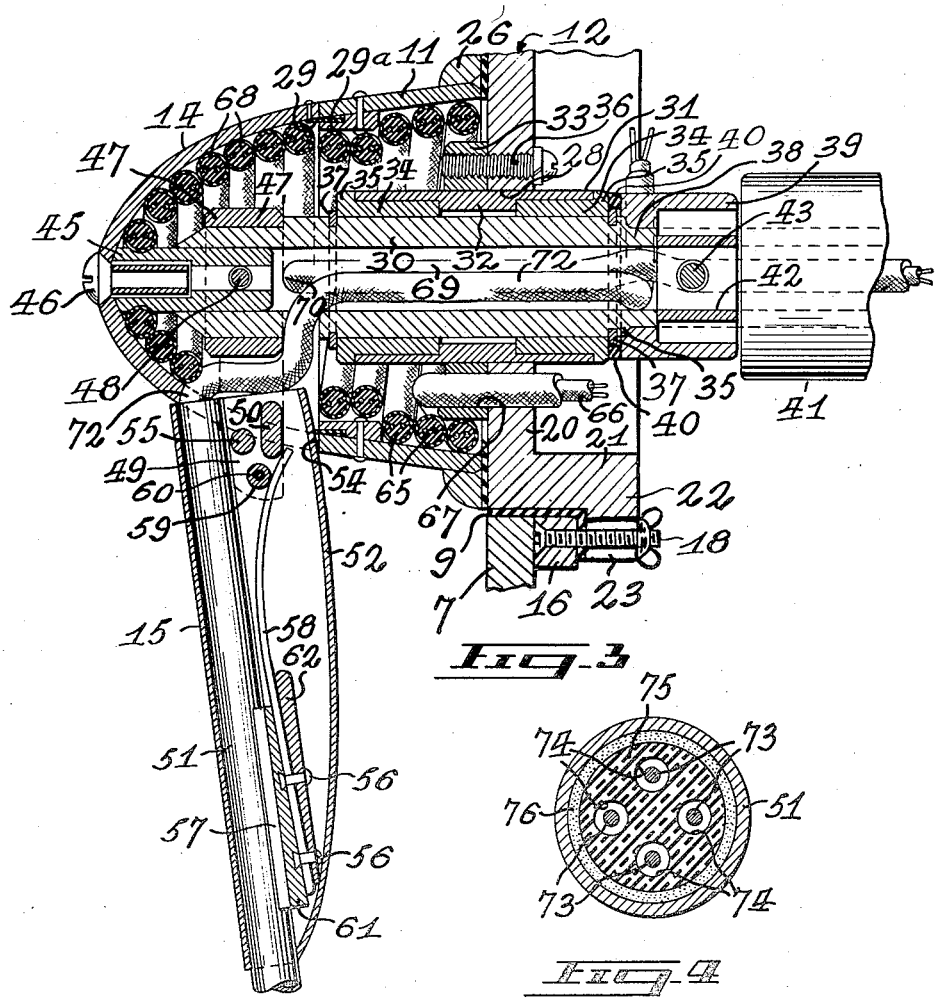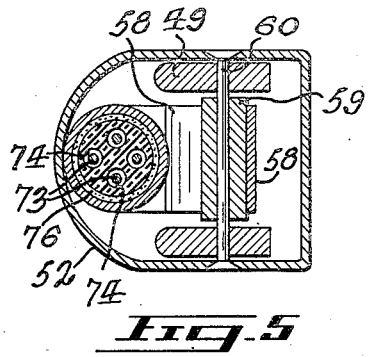

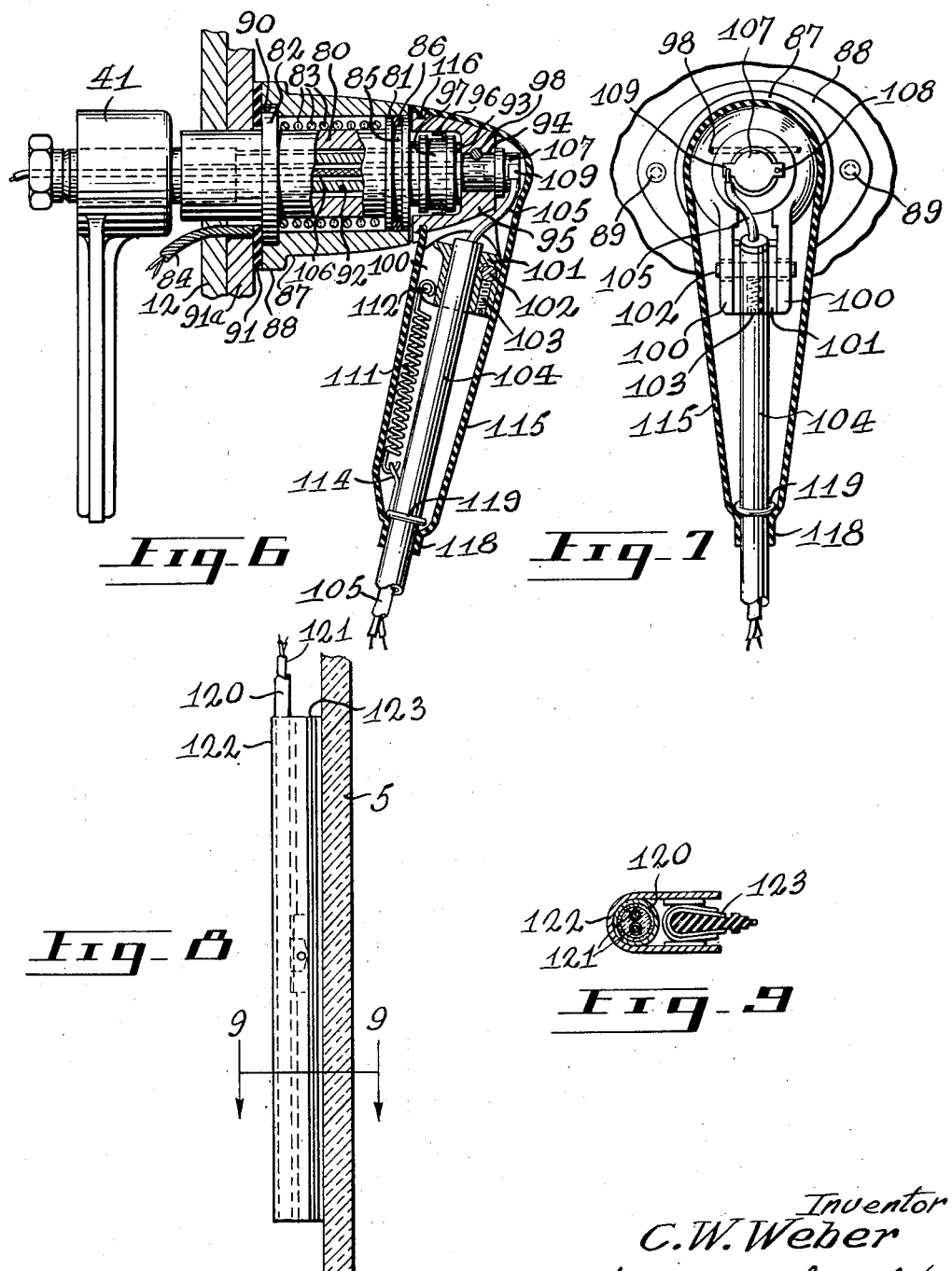

United States Patent Office 2,802,231
Patented Aug. 13, 1957

2,802,231

WIPER MECHANISMS

Charles W. Weber, Montreal, Quebec, Canada, assignor to Beclawat (Canada) Limited, Montreal, Quebec, Canada Application August 22, 1956, Serial No. 605,561

17 Claims. (Cl. 15—250.5)

This invention relates to improvements in wiper mechanisms for transparent shields.

One of the objects of this invention is to provide a novel assembly of elements of a wiper mechanism which is readily dismantled and installed either as a complete unit or in sections as sub-units of the entire assembly.

Another object is to provide a wiper mechanism of the character described with individual heating elements for each sub-unit of the assembly which may be separately attached to or detached from the assembly with the sub-unit without affecting the operation of the remaining heating elements.

Still another object is to provide a novel heating arrangement for a wiper assembly which will ensure de-icing of the movable sub-units of the assembly which are exposed to weather conditions as well as de-icing the stationary portion of the assembly upon which ice formation would affect operation of the movable units.

A further object of this invention is to provide a wiper mechanism with housing means for the stationary and oscillating portions of a wiper mechanism and heating elements disposed therewithin to develop a surface temperature sufficient to maintain the exposed surface area of the mechanism in an ice free condition.

A still further object is to provide a heated wiper mechanism of the character described with a control means for regulating the temperature of said mechanism to ensure an ice free condition of the mechanism without overheating.

Proceeding now to a more detailed description, reference will be had to the accompanying drawings, in which—

Fig. 3 is a vertical sectional view, enlarged, of the portions of the wiper assembly shown in elevation in Fig. 2.

Fig. 4 is an enlarged sectional view taken along the lines 4—4 of Fig. 2.

Fig. 5 is an enlarged sectional view taken along the lines 5—5 of Fig. 2.

Fig. 6 is a fragmentary sectional view showing a modification of a wiper mechanism embodying my invention.

Fig. 7 is a front elevational view of the wiper assembly illustrated by Fig. 6 with the water-tight boot broken away.

Fig. 8 is a fragmentary view of a wiper arm assembly embodying my invention.

Fig. 9 is a sectional view taken along the lines 9—9 of Fig. 8.

Figure 2:
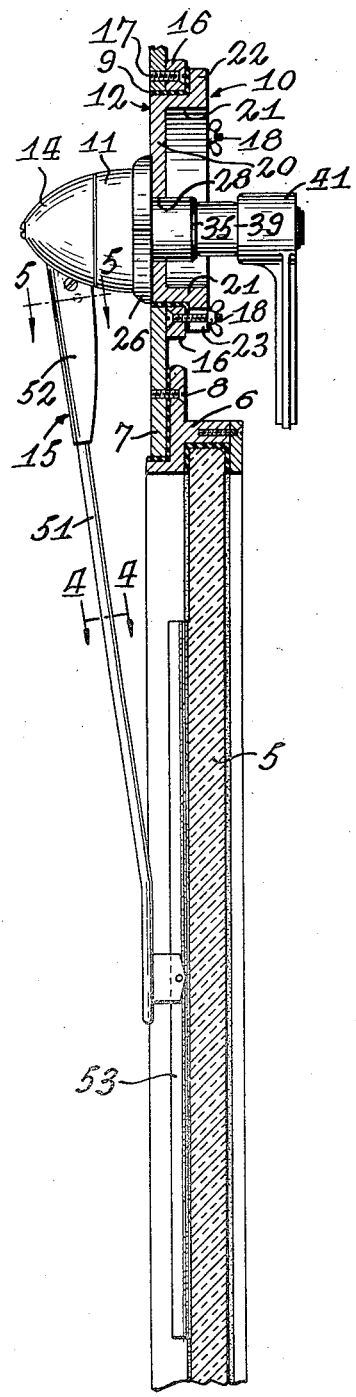
Fig. 2 is a vertical sectional view showing portions of the wiper assembly in side elevation.
Figure 1:
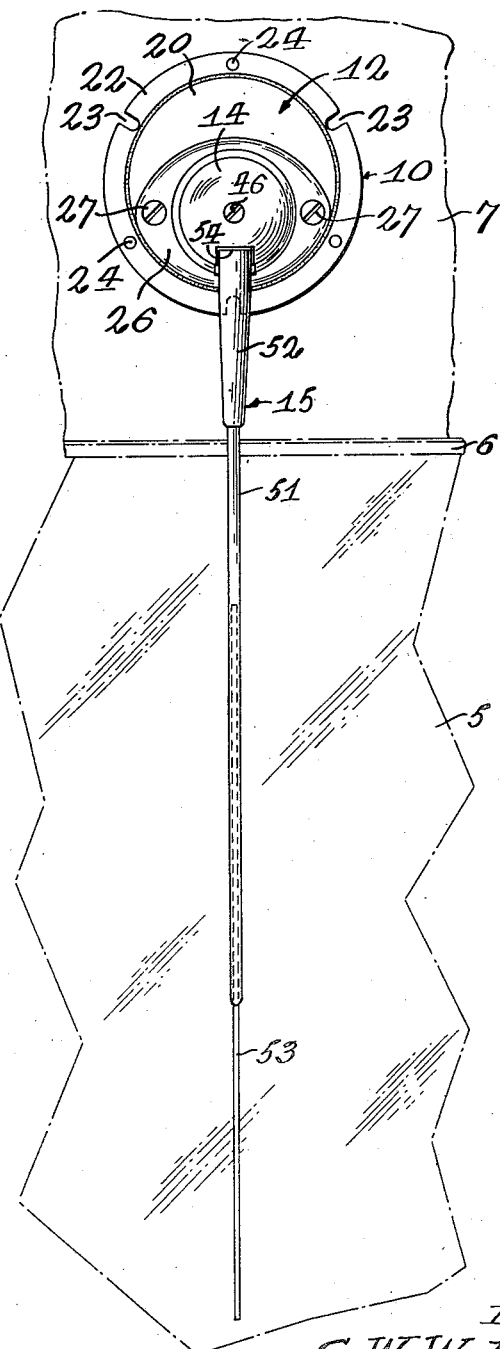
Fig. 1 is a front elevational view of a wiper assembly embodying my invention.

Referring more particularly to Figs. 1 to 5 of the drawings, 5 generally indicates a viewing window pane in a frame 6 which is mounted in the framework of an observation post, such as, for example, the wheel house of a ship, said framework including an upper panel or heading 7, the lower marginal portion of which is disposed in a recessed portion of frame 6 and is secured thereto, as indicated at 8, in overlapping relation with the viewing window rearwardly offset with respect to said upper panel 7.

Panel 7 is provided with an opening 9 through which an oscillating window wiping assembly 10 projects. Assembly 10 includes a stationary rear shell member 11, fixed to a backing plate 12, a front shell member 14 mounted adjacent the forward end of rear shell 11 for oscillating movement relative to said stationary shell and a wiper assembly, generally indicated at 15, which is carried by said front shell 14 for oscillating movement therewith.

A spacer ring 16 is secured to the inner surface of panel 7 about the opening 9 therethrough by bolts 17 and carries rearwardly projecting clamping screw-bolts 18 for securing backing plate 12 thereto. The backing plate 12 is shaped to provide a central disc-like section 20 having a rearwardly projecting circumferential wall 21 and a marginal flange 22 which is rearwardly offset with respect to the central disc section 20. The backing plate has its central disc section 20 fitted in the opening 9 of panel 7 with its wall portion 21 inside of ring 16 and its marginal flange 22 butted against the rear face of ring 16. The flange 22 is provided with slots 23 and also with centering holes 24 by means of which the flange 22 is aligned with ring 16 having corresponding centering holes. When the flange and ring are aligned, clamping screw-bolts 18 of ring 16 may be properly adjusted in the slots 23 of flange 22 for securing said flange in clamping engagement with ring 16 so that the outer surface of the disc section 20 of backing plate 12 is flush with the outer or outboard surface of the panel 7.

The stationary rear shell member 11 is substantially frusto-conical and is open at both ends. The base end of shell member 11 is provided with a flange 26 which is secured by screws 27 to the outer surface of backing plate 12 about an intermediate opening 28 provided in said backing plate. The front shell member 14 is substantially dome-shaped having an open rear end which is fitted in edge-to-edge relation with the forward end edge stationary rear shell member 11 so as to be rotatable relative thereto. The adjacent portions of shells 11 and 14 have lapping sealing rings 29 and 29a arranged to permit free rotation of the front shell 14 relative to the stationary shell 11.

The front shell member 14 is rotatably connected to a hollow shaft 30 which extends through the opening 28 in backing plate 12 within a bearing assembly. The bearing assembly comprises an outer cylinder 31 having a central annular thickened portion 32 which projects inwardly of the inner surface of said cylinder, an outer ring 33 fixed to the outer surface of the cylinder at the thickened portion 32 and bearing sleeves 34 which are fitted into opposite ends of the cylinder 31 with their inner ends butted against the marginal edges of the annular thickened portion 32. Flanges 35 at the outer ends of sleeves 34 are butted against the opposing end edges of said cylinder.

The bearing assembly is secured to the backing plate 12 by means of screws 36 which extend through the backing plate from the inboard side and are threadedly engaged in threaded openings in the fixed outer ring 23 so as to compress said ring against the outer or outboard surface of the backing plate 12. The inner surface of the annular thickened portion 32 is spaced from the hollow shaft 30 so that said shaft 30 is in oscillatable contact only with the inner surface of the bearing sleeves 34. The shaft 30 is provided with grooves located adjacent opposite ends of the bearing assembly to receive retaining rings 37 having peripheral marginal portions which project radially adjacent the outer ends of the bearing sleeves 34 to prevent movement of said shaft relative to the bearing assembly in the direction of the axis of said shaft.

The inner or inboard end of shaft 30 is provided with a short shank 38 of reduced diameter over which the thickened end of a clutch shaft coupler 39 is fitted for rotation with said shaft. A ring bearing 40 is interposed between the flanged end of the adjacent bearing sleeve 34 and the coupler 39. Ring bearing 40 is disposed about the periphery of retaining ring 37 and is of a slightly greater width so as to space the adjacent edge of the coupler from said retaining ring. A standard clutch mechanism 41, which may be manually or otherwise operated, has a hollow shaft 42 which projects into coupler 39 and is detachably secured to said coupler by a locking screw 43 to impart movement to the shaft 30 in response to oscillation of the clutch shaft 42.

A hollow plug 45 is press fitted in the outboard end of shaft 30. The outer end of plug 45 is internally threaded to receive therein a hollow screw 46 which extends through a central opening in front shell 14 and secures said shell to shaft 30 for oscillating movement therewith. The forward end of shaft 30 has a collar 47 fitted thereabout and secured in place by a locking pin 48 which extends through collar 47, shaft 30 and plug 45. Collar 47 has a pair of parallel, depending brackets 49 connected intermediate their length by a transverse spacer bar 50. A tubular wiper arm 51, having its upper end secured in a connection shell 52, carries a wiper blade 53 at its lower end. The shell 52 extends into a bottom opening 54 in the front shell 14 and is pivotally connected to brackets 49 intermediate their length by means of a pivot pin 55. The axis of the pivot pin 55 is located at one side of the centre line of the tubular arm 51 so that the latter is suspended at an angle to a vertical plane intersecting the axis of said pin with the lower end of said arm 51 on the opposite side of said vertical plane to dispose the wiper blade 53 adjacent the outboard surface of the window pane 5.

A pair of vertically spaced retaining loops 56 are carried by a plate 57 which is secured to wiper arm 51 within connection shell 52 so that the loops project rearwardly of said wiper arm 51 at remote distances from the pivot pin 55. One end of a flat spring member 58 is fitted in loops 56. The other end of spring 58 is disposed with its front face in pressured engagement with a roller 59 mounted on a roller pin 60 carried by brackets 49 below and rearwardly of said arm pivot pin 55. A pre-loading wedge 61 is inserted through loops 56 between plate 57 and spring 58 with its tapered end uppermost to give the spring a forward and upward inclination so as to increase the pressure on the free end of the spring 58 against roller 59. A second wedge 62 is driven between spring 58 and the bail portion of loops 56 with the tapering portion of the wedge pointing downwardly to ensure said inclination of the spring. This pressure increases the tendency towards rearward swinging movement of the wiper arm 51 about its pivotal axis 55 so as to urge the wiper blade 53 into resilient pressure contact with the window pane 5. The amount of pressure can be regulated by varying the distance between the roller 59 and the upper end of the second wedge 62 along the rear surface of spring 58. This could be accomplished, for example, by the use of wedges of different lengths.

One of the most serious problems of a windshield wiper, particularly for ships, has been that they are affected by icing conditions in severe weather which tends to immobilize these wipers. In order to overcome the same, I have provided a novel arrangement of heating coils which, in combination with the arrangement of the elements of the wiper assembly, resists the formation of ice and the resultant immobilization of the wiper. As will be seen in the drawings, the stationary rear shell 11 will be provided with a spiral heat conducting coil 65 which extends around the inner surface of the shell 11. Conducting wires 66 from the coil 65 extend through openings 67 in ring 33 and backing plate 12 for connection to a source of power supply outlet (not shown). Similarly the front shell 14 is lined with a spiral heat conducting coil 68. Conducting wires 69 from the coil 68 extend through a side opening 70 in shaft 30 and along the central bore of the shaft 30 and clutch shaft 42 for connection to another source of power supply outlet (not shown). This arrangement permits freedom of oscillation of the coil 68 in cooperation with the oscillation of the front shell 14 and shaft 30. Still another set of conducting wires 72 from a suitable outlet (not shown) extends through a side opening in coupler 39 and along the bore of shaft 30 to the upper end of wiper arm 51 where they are connected to heating wires 73 in said arm. The heating wires 73 are contained in longitudinal passages 74 in a ceramic insulator 75. Insulator 75 is disposed along the length of the tubular wiper arm 51 and is held in spaced relation to the inner surface of said arm by a packing sand or other suitable packing material 76.

These heating elements serve to keep the wiper assembly free from ice formations which would otherwise build up and interfere with the operation of the assembly. Further, it is desirable to have the stationary shell 11, the front shell 14 and the wiper arm 51 heated as it has been found that with the elimination of heating elements from any one of them, ice formation is permitted to build up, which interferes with the operation of at least one of the others. It is also desirable that each of the units be separately connected to separate source of current supply outlets to permit the continued heating of the remainder of the units in the event that it is necessary to disconnect one of the heating elements. The particular arrangement of the separate heating elements and their leads also permits dismantling and assembly of the shells and wiper arm as integral units.

In Figs. 6 and 7 I have illustrated another example of a window wiping assembly embodying my invention. This consists of a hollow cylindrical bearing housing 80 projecting through an opening in a backing plate 12 and having front and rear peripheral flanges 81 and 82 on the outboard side of the backing plate 12 to form a spool-like section about which an electrically insulated heating element 83 is arranged. A lead 84 from heating element 83 extends through suitable openings in flange 82 and backing plate 12 for connection to a source of electrical current supply (not shown). The housing front flange 81 is provided with a peripheral groove 85 to receive an O ring 86. A stationary shell 87, having a flange 88 at its rear end, is fitted about the spool-like section of housing 80.

The inner portion of the shell flange 88 is recessed at 90 to fit over the rear flange 82 of housing 80. Flange 88 is secured against the backing plate 12 by fastening members 89. A gasket 91 is interposed between the flange 88 and backing plate 12 to provide a water-tight seal at the rear of the shell 87. The O ring provides a water-tight seal between the housing 80 and the front of shell 87. The gasket 91 may be composed of a heat insulating material, or alternatively a heat insulating panel 91a may be interposed between the gasket 91 and the backing plate 12 through the rear end of the shell 87.

The bearing housing 80 incorporates bearings for the support of a hollow oscillating shaft 92 which is connected on the inboard side to a clutch mechanism 41. The forward end of bearing housing 80 has an extension 93 which projects beyond the front end of stationary shell 87, and the forward end of shaft 92 projects beyond the housing extension 93, as indicated at 94. A hollow nose section 95 is fitted over the forward end 94 of shaft 92 and is provided with an enlarged recess 96 into which the extension 93 of housing 80 is received so that the rear face of nose section 95 is positioned in close proximity to the front of the stationary shell 87. Extension 93 of housing 80 is provided with a peripheral groove 97 into which a U-shaped gland is fitted with its outer lip compressed against the side defining wall of recess 96 in the nose section 95 to provide a water-tight seal which does not restrict oscillating movement of the nose section 95 relative to the housing extension 93. The nose section 95 and shaft end 94 are provided with complementary grooves into which a key 98 is fitted to lock them together for positive rotation of said nose section in response to oscillating of the shaft 92.

Nose section 95 carries a pair of depending lugs 100 which serves as a yoke between which a coupling member 101 is fitted for swinging movement about a horizontal axis pin 102. A set screw 103 in coupling 101 bears against pin 102 to hold said pin against longitudinal movement. Coupling member 101 is secured to the upper end of a tubular wiper arm 104 which carries a heating element 105 therebetween. The hollow shaft 92 has a lead wire 106, extending therethrough which is connectible at its inner end to a source of current supply, and to the heating element 105 of the wiper arm. A side opening in the forward end 94 of shaft 92 provides an outlet for the lead wire 106 which is connected to one terminal of a thermostat 107, as indicated at 108. The lead of heating element 105 is connected to the other terminal of the thermostat, as indicated at 109.

The wiper arm 104 is provided with a wiping blade (not shown) at its remote end. The blade is maintained in contact with a viewing pane surface such as shown at 5 in Figs. 1 and 2 by means of a tension spring 111 connected at one end to coupling member 101, as indicated at 112, and at the other end to a loop 114 carried by the wiper arm. Tension spring 111 rotates the arm 104 about pivot pin 102 so as to urge the arm and blade carried thereby into pressure contact with the viewing pane.

The moving elements consisting of the nose section 95 and the wiper arm 104 are enclosed in a water-tight flexible boot 115. Boot 115 has a thickened internal flange 116 at one end which is receivable in a complementary groove at the rear of nose section 93. The other end of boot 115 has a restricted throat 118 which fits snugly about the tubular arm 104. A flange 119 located at a predetermined distance along the length of arm 104 restricts sliding movement of the boot throat portion 118 toward the nose section. Boot 115 serves as a protective covering for the nose section 95, thermostat 107 and the upper portion of the wiper arm 105 against the elements and also serves to entrap the heat transmitted from heating elements 83 and 105 to the nose section 95.

The electrical feed circuit to the heated tubular arm is in the form of an insulated, current conducting lead wire 106 carried through the hollow shaft 92 to the electrical parts in and associated with the nose section 95. The thermostat 107 is suitably arranged so that it will cut off all current to the nose section and to the stationary section when a desired temperature in the nose section has been reached.

The design principle of the heating arrangement is that the heating element 83 will generate sufficient heat to melt or to discourage an accumulation of ice on the outer surface of stationary shell 87. The heat from element 83 is also sufficient so that it will be conducted into the nose section 95 to elevate its temperature. At the same time the heat generated in the wiper arm 104 through element 105 will maintain the arm in an ice-free condition and will also cause a portion of the heat to be conducted to the nose section 95. With the heating elements 83 and 105 properly distributed and calculated, the heat transmitted to the nose section 95 will be such all surfaces will reach a reasonably uniform temperature. Thus, with the thermostat located at the outermost point of the nose section, the thermostat will serve to control the temperature at this point, and assure that all parts of the device have reached a temperature sufficient to prevent the accumulation of ice thereon.

Since it is the essential requirement of the heating elements to keep all surface areas of the mechanism free from ice, it will be apparent that the surface temperature of any part must be at least 32° F. In order to ensure this condition the thermostat need only be set to cut off the current supply at a relatively low temperature, for example, about 60° F. This will ensure that sufficient heat is supplied to the nose section 95 without elevating the maximum temperature of the heating elements to a point which would result in damage to any of the working parts. The heating elements may also be designed to elevate the temperature of the working parts of the mechanism rapidly until cut off by the thermostat, for example, by the use of heating elements having an extremely high B. t. u. output.

A thermostat may also be installed in the nose of the front shell member 14 and arranged to cut off the current supply to the heating elements 65, 68 and 73, shown in Figs. 3 to 5 of the drawings, to regulate the heat supply to the working and surface parts of the mechanism shown therein.

Figs. 8 and 9 illustrated a further modification which may be associated with the mechanisms as illustrated in Figs. 1 to 5, and 6 and 7 respectively. The wiper arm 120, having a heating element 121 extending therethrough, has its lower portion shrouded in a U-shaped heat reflector 122. Reflector 122 retains a wiper blade 123 therebetween. The wiper blade 123 is subjected to the heat from the element 121 and the reflector 122 to maintain it in an ice-free condition.

The above examples, while illustrating embodiments of my invention, are not intended to limit the invention to these specific showings, it being understood that changes and modifications may be embodied without departing from the scope and spirit of this invention as defined in the appended claims.

For example, the heating coils are purely illustrative and may be substituted by any suitable heating element which would produce heat sufficient to maintain the stationary and movable shells in an ice-free condition. The manner of installation of the heating elements for connection to a source of current supply may vary, for example by direct leads, collector rings or plug-in arrangements, and in a manner that will permit the various elements to be removed independently.

What I claim is:

1. A wiper assembly comprising an apertured backing member mountable on a panel member at one side of a window frame, a shaft extending through the aperture of said backing member and mounted for oscillating movement relative thereto, a stationary shell secured to one side of said backing member and surrounding a projecting portion of said shaft, said shell being open at its end remote from its connection to said backing member, a second shell closed at one end and open at the other end, said second shell having its open end edge disposed adjacent the edge of said open end of said first shell and being secured to said projecting portion of the shaft for oscillating movement therewith, a wiper arm projecting from said second shell and movable therewith to traverse one surface of a window in said frame in pressure contact with said window, and means contained within said wiper assembly for heating said assembly to prevent ice formation.

2. A wiper assembly as set forth in claim 1, in which said panel member is provided with a central aperture and in which said backing member is removably secured to said panel so as to lie substantially within the aperture of said panel.

3. A wiper assembly as set forth in claim 2, in which said backing member is provided with a rearwardly offset peripheral flange which overlaps one side of a marginal portion of said panel defining the aperture therein, and means for securing said peripheral flange to one side of said marginal portion of the panel so as to project the main body of the panel within the aperture of said backing member.

4. A wiper assembly as set forth in claim 1, including a bearing member secured to said backing member, said bearing member including a tubular cylinder extending through the aperture, in said backing member with portions projecting beyond opposite surfaces of the backing member, and bearing sleeves fitted in opposite ends of the cylinder, said shaft being rotatably mounted in said bearing sleeves, and means for retaining said sleeves and said shaft against movement in the direction of their longitudinal axes.

5. A wiper assembly as set forth in claim 4, in which said last mentioned means comprises a retaining ring receivable in an annular groove in said shaft at opposite ends of the cylinder, each of said rings having portions projecting beyond the periphery of the shaft and in abutting engagement with opposing ends of the sleeves.

6. A wiper assembly as set forth in claim 1, including a sealing strip carried by said stationary shell adjacent said second shell and a second sealing strip carried by said second shell and disposed in lapping relation with said first sealing strip so as to permit relative movement between said sealing strips during rotation of said second shell.

7. A wiper assembly as set forth in claim 1, including a collar fitted about said shaft, a pair of bracket members depending from said collar, said wiper arm comprising a tubular member carried by said brackets for swinging movement about a horizontal axis towards said window, and a heating coil extending through said tubular member, said coil being connected to lead wires arranged in said wiper assembly for oscillating movement with said second shell and wiper arm.

8. A wiper assembly as set forth in claim 7, including an insulating member extending through said tubular member and provided with internal passages for said coil.

9. A wiper assembly as set forth in claim 7, in which said coil lead wires are arranged to extend through the central portion of said shaft in the longitudinal direction thereof, said lead wires having terminal portions extending from said shaft on the side of said backing member remote from the wiper arm for connection to a current source of supply.

10. A wiper assembly as set forth in claim 1, including a heating coil disposed about the inner surface of said second shell for movement therewith in response to oscillation of same, said coil having lead wires extending through the central core of said shaft with terminal portions of said lead wires extending beyond the shaft on the side of the backing member remote from the second shell for connection to a current course of supply.

11. A wiper assembly as set forth in claim 10, including a heating coil disposed about the inner surface of said stationary shell independently of said second shell heating coil.

12. A wiper assembly comprising a housing mounted at one side of a window frame, a shaft extending through said frame with one end projecting into said housing, a wiper arm having a wiper blade and connected to that portion of said shaft disposed within said housing, means operable to translate oscillating movement to said shaft and the wiper arm connected thereto, and a heating element disposed within said housing and operable to maintain the surface of said assembly in an ice free condition.

13. A wiper assembly as set forth in claim 12, in which said heating element extends throughout the length of said wiper arm.

14. A wiper assembly as set forth in claim 12, including thermal control means for regulating the temperature of said heating element.

15. A wiper assembly as set forth in claim 12, in which said heating element extends throughout the length of said wiper arm, and a heat conducting shield arranged over said wiper blade with a portion of said heated arm therebetween.

16. A wiper assembly comprising a housing mounted at one side of a window frame, a shaft extending through said housing, means operably connected to said shaft to oscillate same, a nose section secured to said shaft beyond the outer end of said housing and movable with said shaft in response to oscillation of said shaft, a heating element arranged in said housing to maintain the surface area of said housing and said nose section in an ice free condition, and a heated wiper arm carried by said nose section for oscillating movement therewith.

17. A wiper assembly as set forth in claim 16, a separate heating element in said wiper arm and a thermostat operable to control the temperature of said heating elements in said housing and said wiper arm.

References Cited in the file of this patent

UNITED STATES PATENTS

| | | |
|---|---|---|
| 2,079,573 | Lauer | May 4, 1937 |
| 2,187,876 | Ericson | Jan. 23, 1940 |
| 2,194,671 | Pauro | Mar. 26, 1940 |
| 2,613,387 | Oishei | Oct. 14, 1952 |